United States Patent
Maruta

(10) Patent No.: US 9,007,985 B2
(45) Date of Patent: Apr. 14, 2015

(54) MOBILE COMMUNICATION SYSTEM, RELAY STATION, AND CONTROL METHOD AND PROGRAM FOR RELAY STATION

(75) Inventor: Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 147 days.

(21) Appl. No.: 13/637,561

(22) PCT Filed: Feb. 9, 2011

(86) PCT No.: PCT/JP2011/000731
§ 371 (c)(1),
(2), (4) Date: Sep. 26, 2012

(87) PCT Pub. No.: WO2011/135764
PCT Pub. Date: Nov. 3, 2011

(65) Prior Publication Data
US 2013/0021963 A1 Jan. 24, 2013

(30) Foreign Application Priority Data

Apr. 27, 2010 (JP) .................................. 2010-102344

(51) Int. Cl.
*H04B 7/14* (2006.01)
*H04W 72/04* (2009.01)
*H04B 7/155* (2006.01)
(Continued)

(52) U.S. Cl.
CPC ......... *H04W 72/048* (2013.01); *H04B 7/15507* (2013.01); *H04W 84/047* (2013.01); *H04W 88/04* (2013.01); *H04W 84/005* (2013.01)

(58) Field of Classification Search
USPC ............................ 370/315, 331; 375/295, 340
See application file for complete search history.

(56) References Cited

U.S. PATENT DOCUMENTS

2008/0316968 A1\* 12/2008 Sun et al. ...................... 370/331
2009/0074189 A1 3/2009 Ryu et al.
(Continued)

FOREIGN PATENT DOCUMENTS

EP 2 157 709 A1 2/2010
JP 2009-512389 A 3/2009

OTHER PUBLICATIONS

3GPP TR 36.814 v9.0.0 (Mar. 2010), 3rd Generation Partnership Project; Technical Report; Technical Specification Group Radio Access Network; Evolved Universal Terrestrial Radio Access (E-UTRA); Further Advancements for E-UTRA physical layer aspects (Release 9), 2010, 104 pgs.

(Continued)

*Primary Examiner* — Bob Phunkulh
*Assistant Examiner* — Rose Clark
(74) *Attorney, Agent, or Firm* — Sughrue Mion, PLLC

(57) ABSTRACT

In order to properly operate a fixed relay station and a mobile relay station even under the circumstance where the fixed relay station and the mobile relay station are connected to the same base station, each of relay stations (20_1 and 20_2) forming a mobile communication system (1) notifies a base station (10) of type information which indicates a type of whether or not each relay station is a movable relay station. The base station (10) performs, for each of the relay stations (20_1 and 20_2), at least one of configuration and control according to the type. Further, when the type indicates the movable relay station, the base station (10) notifies information on the at least one of configuration and control to a neighboring base station via an upper layer control device.

3 Claims, 7 Drawing Sheets

(51) Int. Cl.
  *H04W 84/04* (2009.01)
  *H04W 88/04* (2009.01)
  *H04W 84/00* (2009.01)

(56) References Cited

U.S. PATENT DOCUMENTS

2009/0104911 A1* 4/2009 Watanabe et al. ............. 455/436
2012/0002589 A1* 1/2012 Saifullah et al. ............. 370/315
2012/0207078 A1* 8/2012 Hwang et al. ................. 370/315
2012/0231797 A1* 9/2012 Van Phan et al. ............. 455/437
2013/0051309 A1* 2/2013 Van Phan et al. ............. 370/315
2013/0059540 A1* 3/2013 Anschutz et al. ............. 455/41.2
2013/0142109 A1* 6/2013 Wang et al. ................... 370/315
2013/0343477 A9* 12/2013 Jia et al. ........................ 375/295

OTHER PUBLICATIONS

International Search Report for PCT/JP2011/000731 dated Apr. 5, 2011.

* cited by examiner

MOBILE COMMUNICATION SYSTEM, RELAY STATION, AND CONTROL METHOD AND PROGRAM FOR RELAY STATION

CROSS REFERENCE TO RELATED APPLICATIONS

This application is a National Stage of International Application No. PCT/JP2011/000731 filed Feb. 9, 2011, claiming priority based on Japanese Patent Application No. 2010-102344 filed Apr. 27, 2010, the contents of all of which are incorporated herein by reference in their entirety.

TECHNICAL FIELD

The present invention relates to a mobile communication system, a relay station, and a control method and program for the relay station, and particularly to a technique to perform configuration and control for a radio relay station.

BACKGROUND ART

In LTE-A (Long Term Evolution Advanced), there has been examined the introduction of a radio relay station (RN: Relay Node) which includes a function of wirelessly relaying for the purpose of expanding the coverage of a radio base station (eNB: enhanced Node B), eliminating a dead zone or the like, and thus the development of specifications of the radio relay station is under way. Further, among various types of radio relay stations, it has been decided to employ a radio relay station (Type1 RN) that relays layer 3 information (for example, see NPL 1).

The Type1 RN includes a function of transmitting/receiving signals to/from a mobile station (UE: User Equipment) as with the eNB. Further, the Type1 RN includes a function of transmitting/receiving signals between the Type1RN itself and its serving radio base station (DeNB: Donor eNB). Note that in the subsequent description, the term "eNB" indicates the DeNB. Further, a radio interface between the RN and the eNB is referred to as "Backhaul Link", and a signal transmitted through the Backhaul Link is referred to as "backhaul signal". On the other hand, a radio interface between the RN and the UE is referred to as "Access Link", and a signal transmitted through the Access Link is referred to as "access-link signal".

The frequency band of a downlink access-link signal from the Type1 RN to the UE is equal to that of a downlink backhaul signal from the eNB to the Type1 RN. Further, the frequency band of an uplink access-link signal from the UE to the Type1 RN is equal to that of an uplink backhaul signal from the Type1 RN to the eNB.

Accordingly, in a mobile communication system to which the Type1 RN is applied, signals in the same frequency are basically handled in a time-division manner. The eNB performs control on scheduling in the time-division manner.

Note that as variations of the Type1 RN, there will be defined a Type1a RN which uses mutually different frequency bands for the backhaul signal and the access-link signal, and a Type1b RN which uses the same frequency band for the backhaul signal and the access-link signal but ensures spatial isolation (in other words, need not handle signals in the time-division manner). Meanwhile, the present invention can be applied to each and every one of the Type1 RN, the Type1a RN, and the Type1b RN. Therefore, in the subsequent description, the Type1 RN, the Type1a RN and the Type1b RN are collectively referred to as "RN" without distinguishing one from another. Further, in some cases, the radio relay station (RN) is abbreviated as "relay station", and the radio base station (eNB) is abbreviated as "base station".

Further, in the RAN meeting of 3GPP (RAN#60, February 2010), it was agreed that only a Fixed RN would be considered as the RN in the beginning of practical applications of the LTE-A (Release 10). The Fixed RN means, as its name suggests, a radio relay station which does not move in principle after the placement thereof.

On the other hand, in the future, it will be imperative to introduce a Mobile RN which can accommodate moving UEs by placing the Mobile RN within a bus, a train, or the like. With the introduction of the Mobile RN, it is predicted that the Fixed RN and the Mobile RN may be inevitably mixed within a cell formed by an identical eNB (in other words, the both RNs may be connected to the same eNB).

CITATION LIST

Non Patent Literature

NPL 1: 3GPP TR 36.814 V9.0.0 (2010-03), "Further Advancements for E-UTRA Physical Layer Aspects", Section 9

SUMMARY OF INVENTION

Technical Problem

However, there is a problem that it is difficult to properly operate a fixed relay station and a mobile relay station under the circumstance where the fixed relay station and the mobile relay station are connected to the same base station. This is because control and configuration suitable for the fixed relay station and the mobile relay station are different, but the base station performing these control and configuration cannot at all determine whether a relay station placed under the control of the base station itself is a fixed relay station or a mobile relay station.

Accordingly, an exemplary object of the present invention is to properly operate a fixed relay station and a mobile relay station, even under the circumstance where the fixed relay station and the mobile relay station are connected to the same base station.

Solution to Problem

In order to achieve the above-mentioned object, a mobile communication system according to one exemplary aspect of the present invention includes a first base station; and a relay station that conducts a wireless relay between the first base station and a mobile station. The relay station notifies the first base station of type information indicating a type of whether or not the relay station itself is a movable relay station. The first base station performs, for the relay station, at least one of configuration and control according to the type.

Further, a relay station according to another exemplary aspect of the present invention is the one that conducts a wireless relay between a base station and a mobile station. This relay station includes a first communication means for conducting wireless communication with the base station; a second communication means for conducting wireless communication with the mobile station; and a control means for controlling the first and second communication means. The control means is configured to notify type information to the base station through the first communication means, and the type information indicates a type of whether or not the relay station is a movable relay station.

Further, a control method according to further another exemplary aspect of the present invention provides a method of controlling a relay station that conducts a wireless relay between a base station and a mobile station. This control method includes notifying the base station of type information indicating a type of whether or not the relay station is a movable relay station.

Furthermore, a control program according to further another exemplary aspect of the present invention causes a relay station that conducts a wireless relay between a base station and a mobile station to execute a process to notify the base station of type information indicating a type of whether or not the relay station is a movable relay station.

Advantageous Effects of Invention

According to the present invention, it is possible to properly operate a fixed relay station and a mobile relay station, even under the circumstance where the fixed relay station and the mobile relay station are connected to the same base station. This is because the base station can recognize whether the relay station placed under the control of the base station itself is a fixed relay station or a mobile relay station, thereby being able to perform configuration and control suitable for each of the fixed relay station and the mobile relay station.

DESCRIPTION OF EMBODIMENTS

Figure 1:
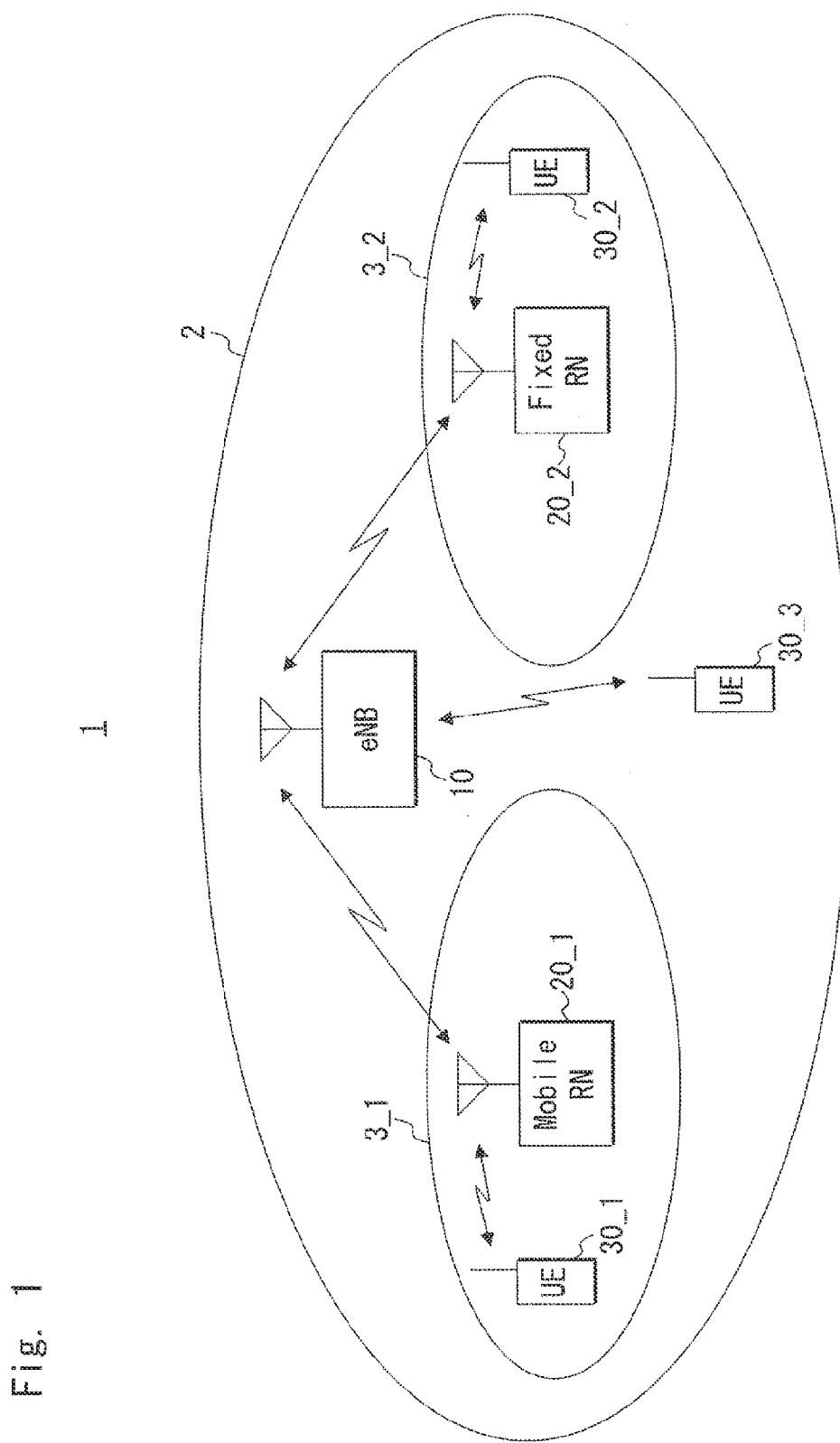
FIG. 1 is a block diagram showing a configuration example of a mobile communication system according to a first exemplary embodiment of the present invention.

Hereinafter, first and second exemplary embodiments of a relay station according to the present invention and a mobile communication system to which the relay station is applied will be described with reference to FIGS. 1 to 8. Note that in the drawings, the identical reference symbols denote identical elements and the redundant explanation thereof will be omitted as appropriate to clarify the explanation.

Further, in each exemplary embodiment, a mobile communication system meeting the LTE-A will be described as an example. Meanwhile, techniques described in each exemplary embodiment can be also applied to a mobile communication system adopting other communication standards besides the LTE-A.

[First Exemplary Embodiment]

As shown in FIG. 1, a mobile communication system 1 according to this exemplary embodiment includes an eNB 10, a Mobile RN 20_1, and a Fixed RN 20_2.

Among them, the eNB 10 forms a cell 2, thereby conducting communication with the Mobile RN 20_1, the Fixed RN 20_2 and a UE 30_3, which are located within the cell 2, through radio propagation channels.

On the other hand, the Mobile RN 20_1 forms a cell 3_1, thereby conducting communication with a UE 30_1 which is located within the cell 3_1. Further, the Mobile RN 20_1 conducts a wireless relay between the eNB 10 and the UE 30_1. Specifically, the Mobile RN 20_1 extracts layer 3 information from an uplink access-link signal received from the UE 30_1, and transmits to the eNB 10 the layer 3 information as an uplink backhaul signal. Furthermore, the Mobile RN 20_1 receives a downlink backhaul signal from the eNB 10, and extracts layer 3 information intended for the UE 30_1 from the downlink backhaul signal to convert this extracted layer 3 information into layer 1 information. Then, the Mobile RN 20_1 adds various control information elements to the layer 1 information to be transmitted to the UE 30_1.

Similarly, the Fixed RN 20_2 forms a cell 3_2, thereby conducting communication with a UE 30_2 which is located within the cell 3_2. Further, the Fixed RN 20_2 conducts a wireless relay between the eNB 10 and the UE 30_2. Specifically, the Fixed RN 20_2 extracts layer 3 information from an uplink access-link signal received from the UE 30_2, and transmits to the eNB 10 the layer 3 information as an uplink backhaul signal. Furthermore, the Fixed RN 20_2 receives a downlink backhaul signal from the eNB 10, and extracts layer 3 information intended for the UE 30_2 from the downlink backhaul signal to convert this extracted layer 3 information into layer 1 information. Then, the Fixed RN 20_2 adds various control information elements to the layer 1 information to be transmitted to the UE 30_2.

Note that in the subsequent description, the Mobile RN and the Fixed RN are sometimes collectively denoted by the symbol 20. Further, one or more mobile stations are sometimes collectively denoted by the symbol 30.

Figure 2:
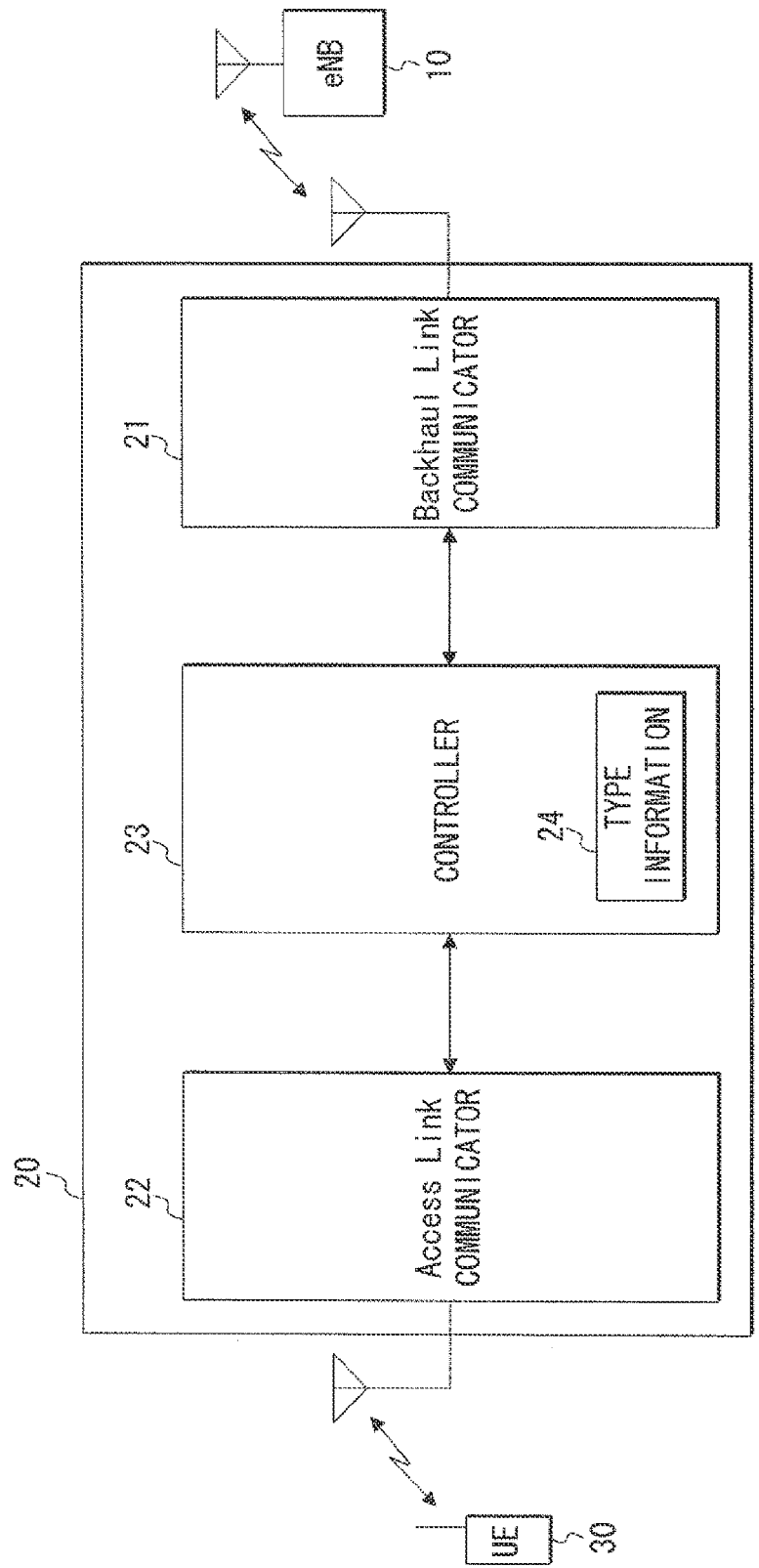
FIG. 2 is a block diagram showing a configuration example of a relay station used in common for mobile communication systems according to first and second exemplary embodiments of the present invention.

As shown in FIG. 2, the RN 20 includes a Backhaul Link communicator 21, an Access Link communicator 22, and a controller 23.

Among them, the Backhaul Link communicator 21 typically operates as an analog front-end for the Backhaul Link. More specifically, the Backhaul Link communicator 21 executes processes, which include amplification, frequency conversion, A/D conversion and the like, for a downlink backhaul signal received from the eNB 10, and provides a baseband signal obtained by these processes to the controller 23. Further, the Backhaul Link communicator 21 executes processes, which include D/A conversion, frequency conversion, amplification and the like, for a baseband signal output from the controller 23, and transmits an uplink backhaul signal obtained by these processes to the eNB 10.

Further, the Access Link communicator 22 typically operates as an analog front-end for the Access Link. More specifically, the Access Link communicator 22 executes processes, which include amplification, frequency conversion, A/D conversion and the like, for an uplink access-link signal received from the UE 30, and provides a baseband signal obtained by these processes to the controller 23. Further, the Access Link communicator 22 executes processes, which include D/A conversion, frequency conversion, amplification and the like, for a baseband signal output from the controller 23, and transmits a downlink access-link signal obtained by these processes to the UE 30.

Furthermore, the controller 23 typically controls the Backhaul Link communicator 21 and the Access Link communicator 22. More specifically, the controller 23 extracts layer 3 information from the signal output from the Access Link communicator 22, and provides this layer 3 information to the Backhaul Link communicator 21. Further, the controller 23 extracts layer 3 information intended for the UE 30 from the signal output from the Backhaul Link communicator 21, and converts this layer 3 information into layer 1 information. Then, the controller 23 adds various control information elements to the layer 1 information to be provided to the Access Link communicator 22.

In addition, the controller 23 stores type information 24, which indicates a type of whether the RN 20 is a Mobile RN or a Fixed RN, inside the controller 23 itself (in a memory, a register or the like). The controller 23 notifies the type information 23 to the eNB 10 through the Backhaul Link communicator 21. In other words, the Mobile RN 20_1 notifies the eNB 10 that the RN 20_1 itself is the Mobile RN. On the other hand, the Fixed RN 20_2 notifies the eNB 10 that the RN 20_2 itself is the Fixed RN.

Next, an operation example of this exemplary embodiment will be described in detail with reference to FIGS. 3 and 4.

Figure 3:
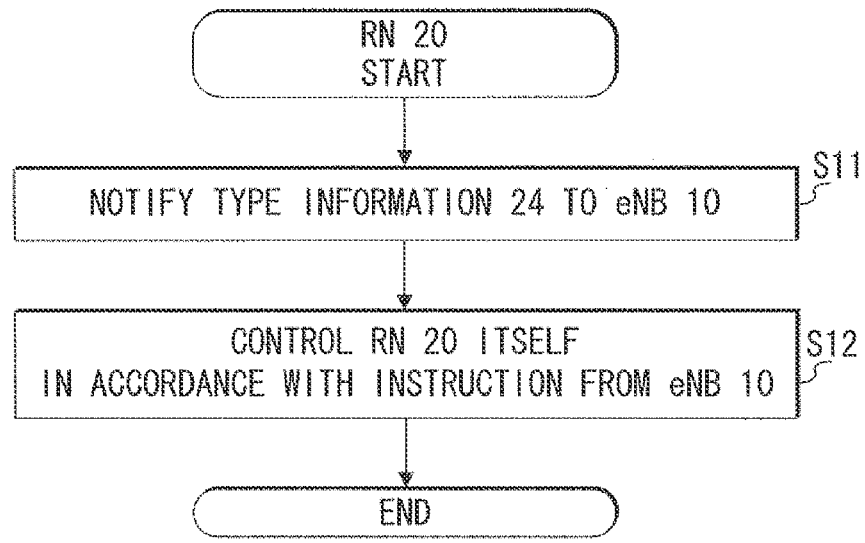
FIG. 3 is a flow chart showing an operation example of the relay station used for the mobile communication system according to the first exemplary embodiment of the present invention.

As shown in FIG. 3, the RN 20 notifies the eNB 10 of the type information 24 at a predetermined timing (Step S11). Then, the RN 20 controls the RN 20 itself in accordance with an instruction received from the eNB 10 and according to the type information 24 (Step S12).

Examples of the timing for notifying the type information 24 include various timings such as when the RN is booted up, before operations as the RN are started after the formation of cell, and shortly after these operations are started. Further, since the type of RN is invariable, it is not necessary in principle to repeat notifying the eNB of the type information 24. However, in a case where the Mobile RN changes its DeNB as will be described later in the following second exemplary embodiment, the type information 24 may be notified to a new DeNB.

Figure 4:
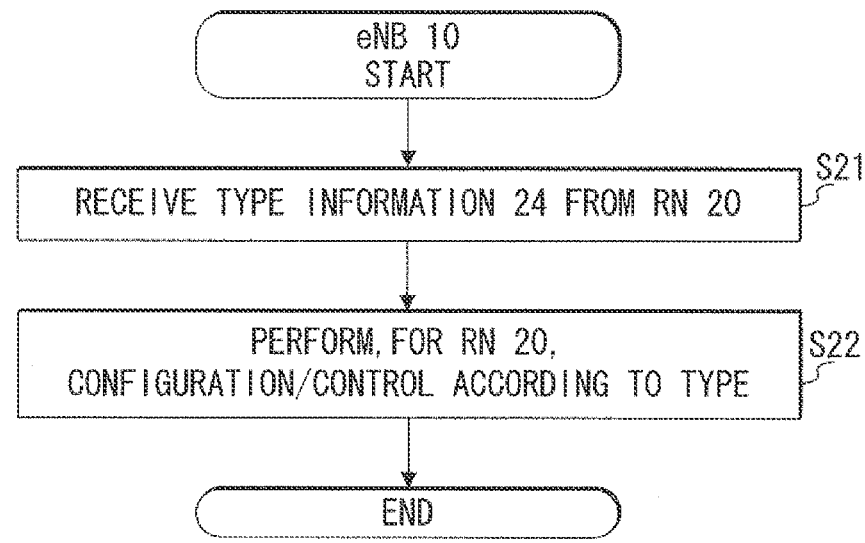
FIG. 4 is a flow chart showing an operation example of a base station used for the mobile communication system according to the first exemplary embodiment of the present invention.

Meanwhile, as shown in FIG. 4, the eNB 10 receives the type information 24 from the RN 20 (Step S21), and then performs, for the RN 20, at least one of configuration and control according to the type indicated by the type information 24 (Step S22). The configuration and control for the RN 20 may be performed so as to be mutually different between the Mobile RN and the Fixed RN, but are not limited to the following examples.

For example, upon configuration for the Fixed RN 20_2, the eNB 10 allocates a DMRS (Demodulation Reference Signal) as a reference signal for demodulating the downlink backhaul signal. As the pattern of DMRS, there is used a pattern which is different from those allocated to other Fixed RNs within the cell 2.

Thus, it is possible to apply beamforming or precoding to the downlink backhaul signal to be transmitted toward the Fixed RN 20_2 (more specifically, to an R-PDCCH (Relay-Physical Downlink Control Channel) and an R-PDSCH (Relay-Physical Downlink Shared Channel)).

Meanwhile, the above-mentioned beamforming and precoding techniques are applicable only because propagation channels between the Fixed RN and the eNB are relatively stable. Thus, the beamforming and precoding are not suitable for the Mobile RN. This is because it is generally predicted that the Mobile RN has wide fluctuations in propagation channels.

Therefore, upon configuration for the Mobile RN 20_1, the eNB 10 allocates a CRS (Cell Specific Reference Signal) as the reference signal for demodulating the downlink backhaul signal. The pattern of CRS is specific to the cell 2, and shared with UEs and other Mobile RNs within the cell 2.

Thus, wherever the Mobile RN 20_1 is located within the cell 2, the Mobile RN 20_1 can receive and accurately demodulate the downlink backhaul signal.

Examples of mutually different control between the Mobile RN and the Fixed RN include instructing the Mobile RN, for which the propagation channels may be in poor condition, to transmit the uplink backhaul signal using higher power than that used by the Fixed RN, and to perform modulation at a smaller number of its multiple levels and a lower coding rate than those of the Fixed RN for the generation of uplink backhaul signal.

Thus, in this exemplary embodiment, the notification of the type of RN to the eNB makes it possible to perform configuration and control suitable for each of the Mobile RN and the Fixed RN. Therefore, it is possible to properly operate the Mobile RN and the Fixed RN, even under the circumstance where the Mobile RN and the Fixed RN are connected to the same eNB.

[Second Exemplary Embodiment]

Figure 5:
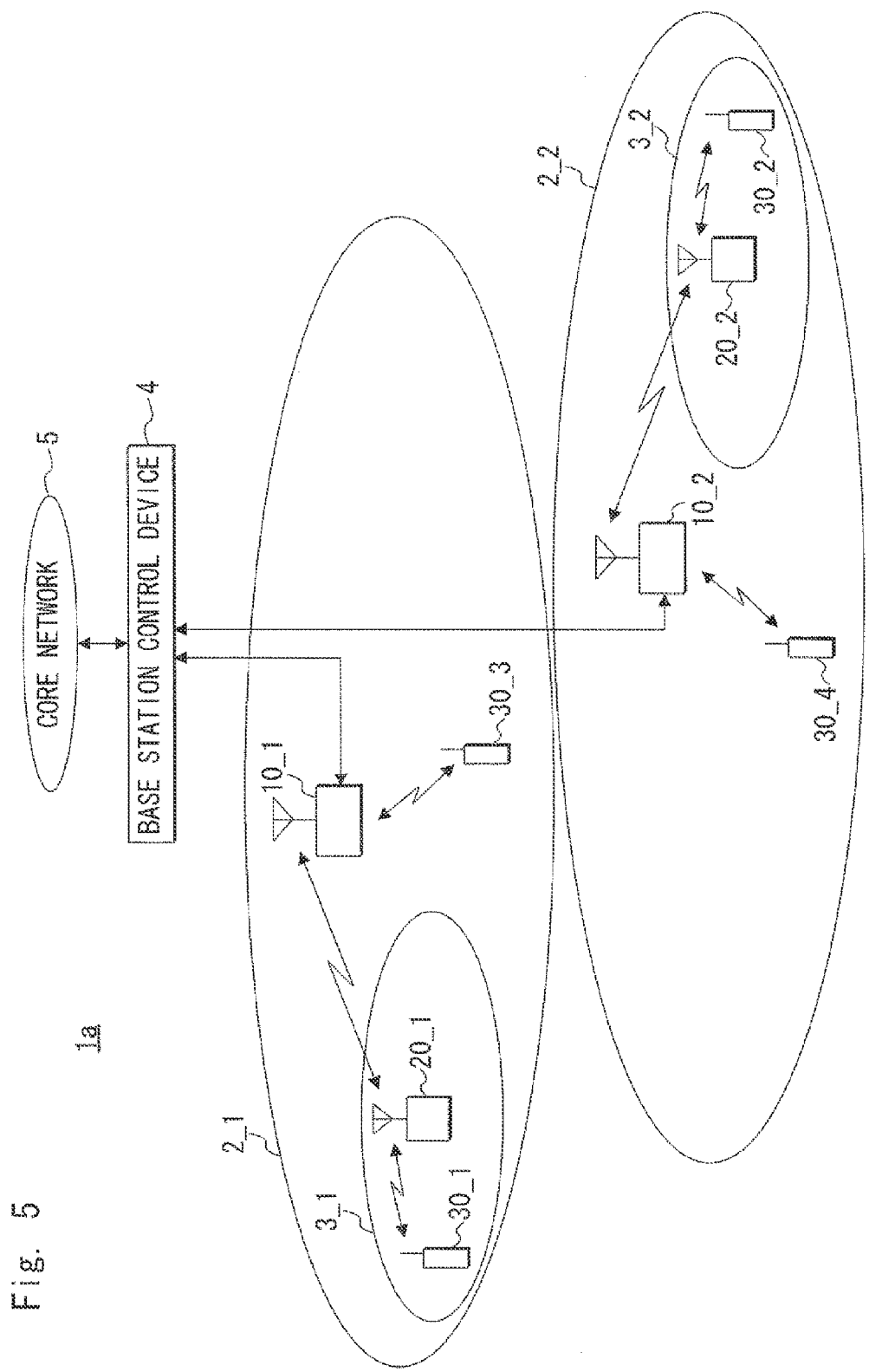
FIG. 5 is a block diagram showing a configuration example of the mobile communication system according to the second exemplary embodiment of the present invention.

As shown in FIG. 5, a mobile communication system 1a according to this exemplary embodiment is different from the mobile communication system 1 shown in FIG. 1 according to the above-mentioned first exemplary embodiment, in that the system 1a includes two units of eNBs 10_1 and 10_2, and a base station control device 4 connecting these eNBs 10_1 and 10_2 with each other. The base station control device 4 includes a function of connecting the eNBs 10_1 and 10_2 to a core network 5. Note that propagation channels between the eNBs 10_1, 10_2 and the base station control device 4, and propagation channels between the base station control device 4 and the core network 5 may be wired or wireless connections. Further, each of the eNBs 10_1 and 10_2 may include a function of connecting to the core network 5, and the base station control device 4 may be connected through the core network 5 to the eNBs 10_1 and 10_2.

In the illustrated example, the Mobile RN 20_1 is located within a cell 2_1 formed by the eNB 10_1. On the other hand, the Fixed RN 20_2 is placed within a cell 2_2 formed by the eNB 10_2. Further, the eNB 10_1 also conducts wireless communication with the UE 30_3 located within the cell 2_1. Furthermore, the eNB 10_2 also conducts wireless communication with a UE 30_4 located within the cell 2_2.

Next, an operation example of this exemplary embodiment will be described in detail with reference to FIGS. 6 to 8.

Figure 6:
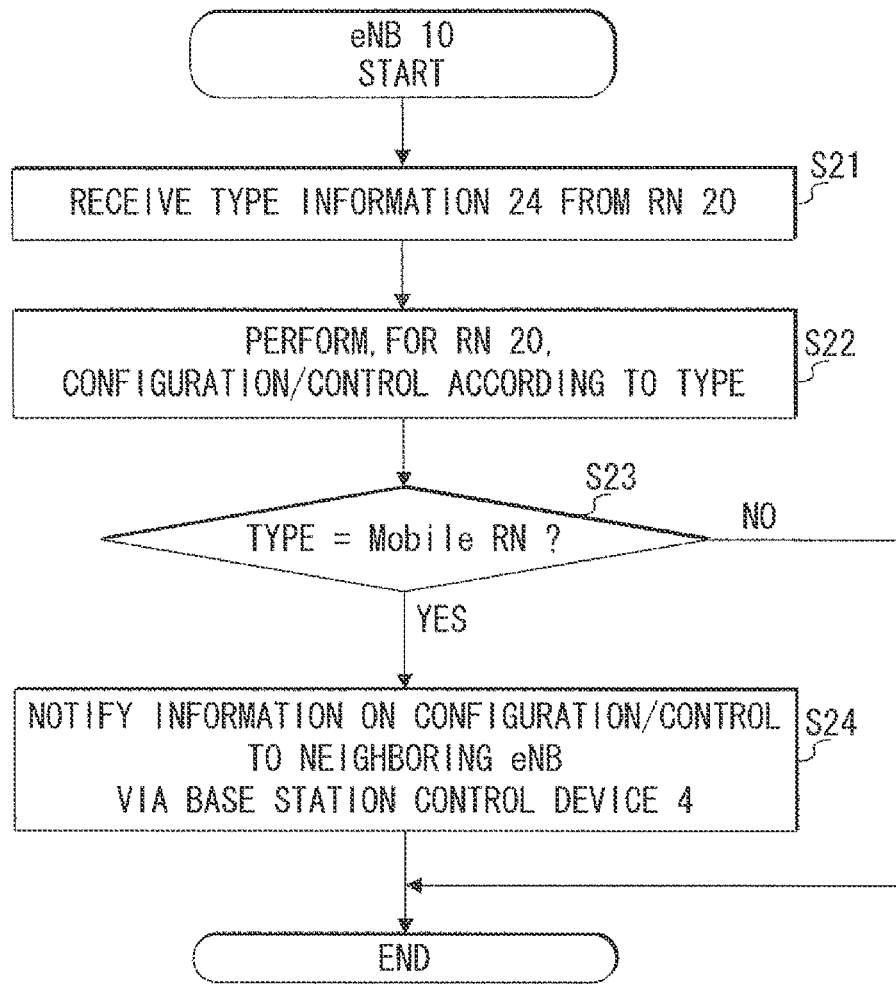
FIG. 6 is a block diagram showing an example of movement of the relay station in the mobile communication system according to the second exemplary embodiment of the present invention.
Figure 7:
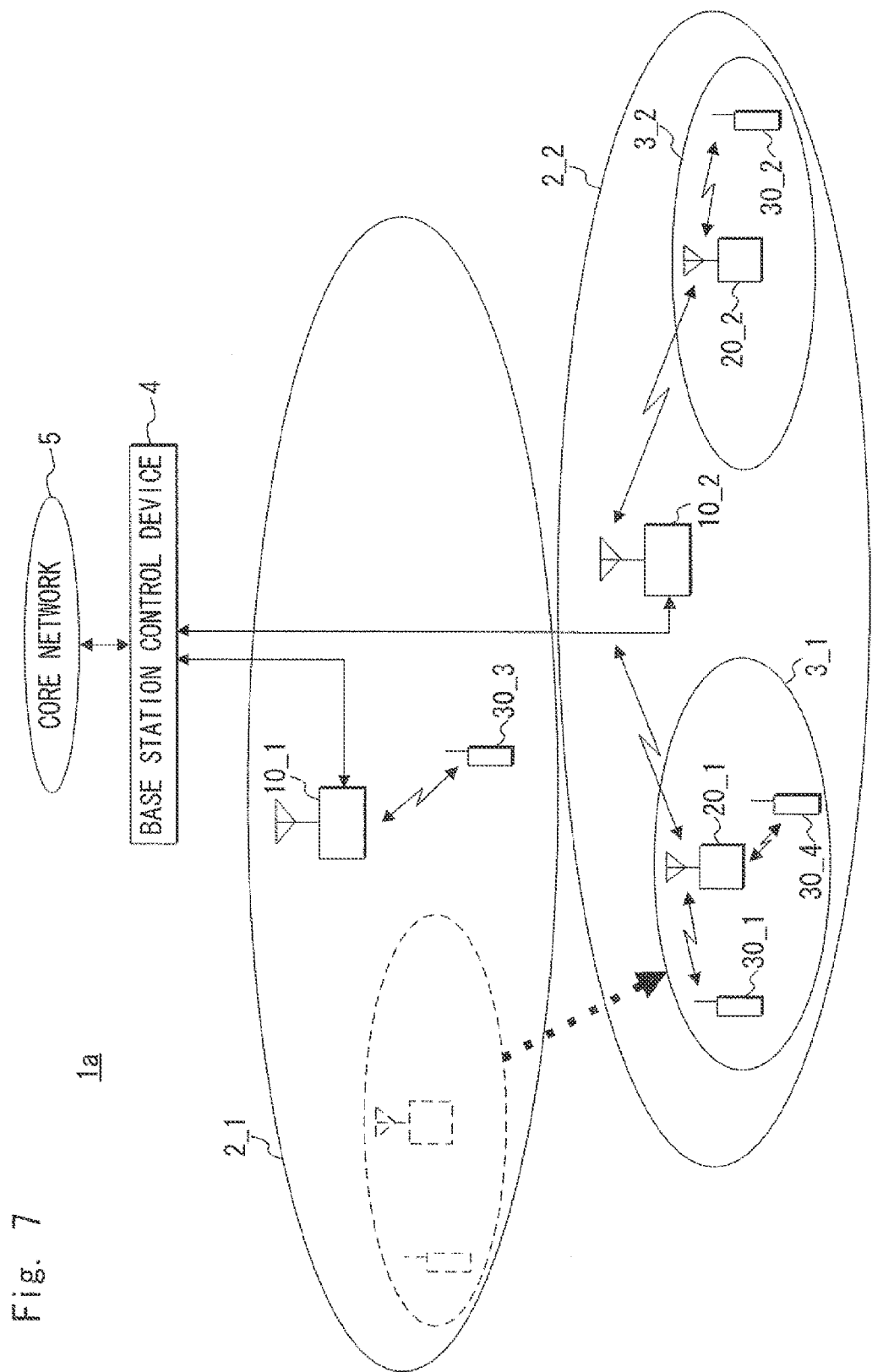
FIG. 7 is a flow chart showing an operation example of a base station used for the mobile communication system according to the second exemplary embodiment of the present invention.

As shown in FIG. 6, the eNB 10_1 executes the above-mentioned Steps S21 and S22 shown in FIG. 4 as is the case with the above-mentioned first exemplary embodiment, thereby performing configuration and control for the Mobile RN 20_1.

However, unlike the above-mentioned first exemplary embodiment, the eNB 10_1 determines whether or not the type information 24 indicates the Mobile RN after the configuration and control for the Mobile RN 20_1 (Step S23).

As a result, if "type=Mobile RN" is satisfied, the eNB 10_1 notifies information on the above-mentioned configuration and control (hereinafter, referred to as "configuration/control information") to the neighboring eNB 10_2 via the base station control device 4 (Step S24). Specifically, the eNB 10_1 notifies the base station control device 4 of the configuration/control information. At this time, the base station control device 4 refers to information on placements of the eNBs or the like, thereby specifying the eNB 10_2 as the one adjacent to the eNB 10_1. Then, the base station control device 4 transfers the configuration/control information to the eNB 10_2. Note that in a case where two or more eNBs are adjacent to the eNB 10_1, the base station control device 4 may transfer the configuration/control information to all neighboring eNBs.

The configuration/control information may include information on various parameters actually instructed to the Mobile RN 20_1, but there is no particular restriction on contents of the configuration/control information. For example, the configuration/control information can include a cell ID, timings for transmitting and receiving signals, information on the quality of propagation channels, information on an amount of accommodated traffic, and the like.

In this way, the configuration/control information with respect to the Mobile RN 20_1 is preliminarily notified to the neighboring eNB 10_2. Therefore, even when the Mobile RN 20_1 moves to the cell 2_2 of the eNB 10_2 as shown by dotted lines in FIG. 7, the Mobile RN 20_1 can maintain its own cell 3_1 (in other words, can move without causing any disconnection of the communication with the UE 30_1, while accommodating the UE 30_1). Further, as shown in FIG. 7, the Mobile RN 20_1 can immediately accommodate a new UE 30_4. Further, it is not necessary to form the cell again. Therefore, it is possible to reduce processing load on the Mobile RN 20_1. Furthermore, it is not necessary to perform the configuration and control for the Mobile RN 20_1. Therefore, it is possible to reduce processing load on the eNB 10_2.

Figure 8:
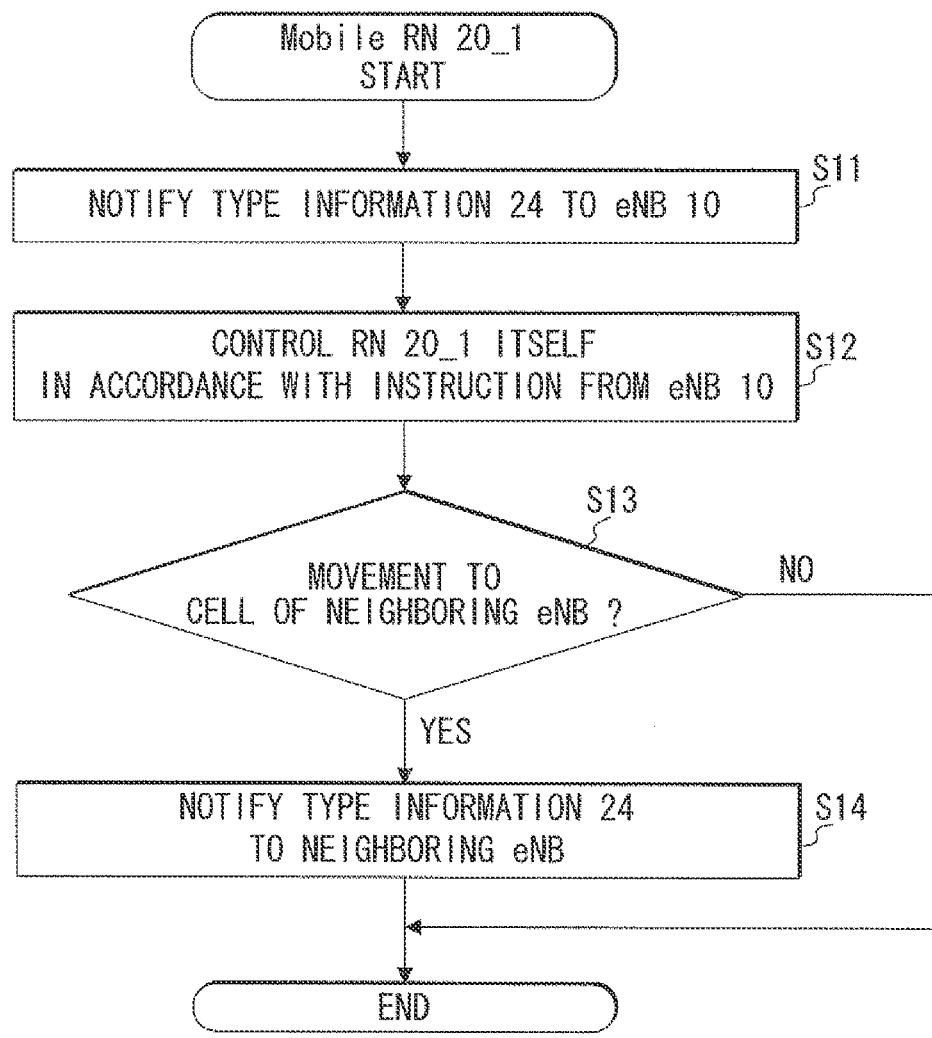
FIG. 8 is a flow chart showing an operation example of the relay station used for the mobile communication system according to the second exemplary embodiment of the present invention.

Note that the Mobile RN 20_1 may operate as shown in FIG. 8. Specifically, the Mobile RN 20_1 executes the above-mentioned Steps S11 and S12 shown in FIG. 3, thereby starting operations as the RN. On the other hand, when the Mobile RN 20_1 detects that the RN 20_1 itself moves to the neighboring eNB 10_2 (Step S13), the Mobile RN 20_1 notifies the neighboring eNB 10_2 of the type information 24 (Step S14). Note that the Mobile RN 20_1 can easily detect, as with a typical UE, the movement to the neighboring eNB 10_2 based on change in the CRS and broadcast information.

Thus, the eNB 10_2 can perform, as with the eNB 10_1, configuration and control for the Mobile RN 20_1. In this case, it is not necessary to notify the configuration/control information between the eNBs. Therefore, it is possible to reduce the amount of traffic between the base station control device 4, and the eNBs 10_1 and 10_2.

Note that the present invention is not limited to the above-mentioned exemplary embodiments, and it will be understood by those of ordinary skill in the art that various changes in form and details may be made therein without departing from the spirit and scope of the present invention as defined by the claims.

For example, each process of the RN 20 described in the above-described exemplary embodiments can be provided as a program to be executed by a computer. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

This application is based upon and claims the benefit of priority from Japanese patent application No. 2010-102344, filed on Apr. 27, 2010, the disclosure of which is incorporated herein in its entirety by reference.

Industrial Applicability

The present invention can be applied to a mobile communication system, a relay station, and a control method and program for the relay station, and particularly applied to the purpose of performing configuration and control for a radio relay station.

The whole or part of the exemplary embodiments disclosed above can be described as, but not limited to, the following supplementary notes.

(Supplementary Note 1)

A control program for causing a relay station that conducts a wireless relay between a base station and a mobile station to execute:

a process to notify the base station of type information indicating a type of whether or not the relay station is a movable relay station.

(Supplementary Note 2)

The program according to Supplementary note 1, further causing the relay station to execute:

a process to control the relay station in accordance with an instruction from the base station, the instruction being determined according to the type.

(Supplementary Note 3)

The program according to Supplementary note 1 or 2, further causing the relay station to execute:

a process to notify the type information to a different base station when the relay station is the movable relay station and it is detected that the relay station moves to a cell formed by the different base station.

REFERENCE SIGNS LIST 1, 1a MOBILE COMMUNICATION SYSTEM
2, 2_1, 2_2, 3_1, 3_2 CELL
4 BASE STATION CONTROL DEVICE
5 CORE NETWORK
10, 10_1, 10_2 eNB
20 RN
20_1 Mobile RN
20_2 Fixed RN
21 Backhaul Link COMMUNICATOR
22 Access Link COMMUNICATOR
23 CONTROLLER
24 TYPE INFORMATION
30, 30_1-30_4 UE

The invention claimed is:

1. A mobile communication system comprising:
a first base station; and
a relay station that conducts a wireless relay between the first base station and a mobile station,
wherein the relay station notifies the first base station of type information indicating a type of whether or not the relay station itself is a movable relay station, wherein the first base station receives the type information from the relay station and performs, for the relay station, at least one of configuration and control according to the type that is determined based on the type information, wherein when the type indicates the movable relay station, the first base station allocates, upon the configuration, a reference signal specific to a cell formed by the first base station itself as a reference signal for causing the relay station to demodulate a radio signal from the first base station itself, and wherein said at least one of configuration and control when the relay station is the movable relay station is different from said at least one of configuration and control when the relay station is not the movable relay station.

2. The mobile communication system according to claim 1, further comprising:

a second base station that is placed adjacent to the first base station; and an upper layer control device that connects the first and second base stations, wherein when the type indicates the movable relay station, the first base station transmits information about said at least one of configuration and control to the second base station via the control device.

3. The mobile communication system according to claim 1, wherein when the type does not indicate the movable relay station, the first base station allocates, upon the configuration, a reference signal specific to the relay station as a reference signal for causing the relay station to demodulate a radio signal from the first base station itself.

* * * * *